US007144725B2

(12) United States Patent
Kozliak et al.

(10) Patent No.: US 7,144,725 B2
(45) Date of Patent: Dec. 5, 2006

(54) REMOVAL OF TOXIC/HAZARDOUS CHEMICALS ABSORBED IN BUILDING MATERIALS

(75) Inventors: Evguenii I. Kozliak, Grand Forks, ND (US); Mikhail K. Beklemishev, Moscow (RU)

(73) Assignee: University of North Dakota, Grand Forks, ND (US)

( * ) Notice: Subject to any disclaimer, the term of this patent is extended or adjusted under 35 U.S.C. 154(b) by 121 days.

(21) Appl. No.: 10/378,275

(22) Filed: Mar. 3, 2003

(65) Prior Publication Data

US 2004/0175818 A1 Sep. 9, 2004

(51) Int. Cl.
*C12S 9/00* (2006.01)
*C12S 13/00* (2006.01)

(52) U.S. Cl. .................................... 435/262.5; 435/264

(58) Field of Classification Search ................ 435/262, 435/262.5, 266, 264, 277, 875; 134/40
See application file for complete search history.

(56) References Cited

U.S. PATENT DOCUMENTS

| | | | | |
|---|---|---|---|---|
| 5,415,777 | A | 5/1995 | Krempen et al. | |
| 5,839,079 | A | 11/1998 | Benson et al. | |
| 6,024,513 | A * | 2/2000 | Hudgins et al. | 405/129.95 |
| 6,159,726 | A | 12/2000 | Kohr | |
| 6,334,395 | B1 | 1/2002 | Badger et al. | |
| 6,344,355 | B1 | 2/2002 | Hince et al. | |
| 6,440,916 | B1 | 8/2002 | Cheung et al. | |
| 6,465,706 | B1 * | 10/2002 | Rogers et al. | 588/1 |

FOREIGN PATENT DOCUMENTS

| | | | |
|---|---|---|---|
| DE | 196 40 089 | A1 | 4/1997 |
| DE | 198 07 789 | A1 | 8/1999 |
| DE | 199 03 180 | A1 | 4/2000 |
| EP | 808671 | A1 * | 11/1997 |

OTHER PUBLICATIONS

English translation of EP 0808671A1 (Nov. 26, 1997).*

Herman, David C., et al., Formation and Removal of Hydrocarbon Residual in Porous Media: Effects of Attached Bacteria and Biosurfactants, Environmental Science & Technology, vol. 31, No. 1997, pp. 1290-1294.

Summary from Delphion Patent Database, EP0808671A1: Method for Cleaning Porous Surfaces with a Washing Liquid Containing Bacteria Having an Enzymatic Activity, Publication of Application, pp. 1-2, Dec. 13, 2004.

Summary from Delphion Patent Database, EP0808671B1: Method for Cleaning Porous Surfaces with a Washing Liquid Containing Bacteria Having an Enzymatic Activity, Patent, pp. 1-2, Dec. 13, 2004.

* cited by examiner

*Primary Examiner*—William H. Beisner
(74) *Attorney, Agent, or Firm*—Kinney & Lange, P.A.

(57) ABSTRACT

A method of removing pollutants from porous, solid materials uses a biomass loaded onto a support. The biomass is put into contact with a pollutant contaminated porous, solid material so that the bacterial biomass degrades the pollutant. The moisture level of the support and biomass are maintained at a level that optimizes pollutant removal and is a function of the relative solubility of the pollutant.

28 Claims, 9 Drawing Sheets

| FORM OF n-HEXADECANE | INITIAL AMOUNT OF n-HEXADECANE, μl | | | |
|---|---|---|---|---|
| | 5 | 25 | 50 | 100 |
| RETAINED IN CONCRETE, % | 96±2 | 98±3 | 61±3 | 46±5 |
| EXTRACTED FROM THE FLASK AND FLUIDS WITH n-DECANE, % | 0.3±0.1 | 0.2±0.1 | 34±4 | 46±3 |
| MASS BALANCE (TOTAL RECOVERY), % | 97±2 | 98±3 | 95±7 | 92±7 |

Fig. 1

| FORM OF n-HEXADECANE | SOIL BACTERIA | | | Ps. aeruginosa PG201 | |
|---|---|---|---|---|---|
| | NO SURFACTANT | PLURONIC F-68 | BRIJ-35 | NO SURFACTANT | CTMA |
| NEAT-FORM | 99.0%-99.5% | -- | -- | 98%-99% | -- |
| CONCRETE-ABSORBED | 10%-17% | 10% | 0%-5% | 8%-19% | 0%-6% |

Fig. 2

| FORM OF n-HEXADECANE | BIOMASS | WATER-SOLUBLE COMPOUNDS | GASES |
|---|---|---|---|
| NEAT-FORM | 30%-50% | 4%-5% | 45%-65% |
| CONCRETE-ABSORBED | 0.9%-1.5% | 1%-9% | 90%-98% |

Fig. 3

| Incubation Time (with Naphthalene) | Radioactivity Found (counts/min.) | | Overall Radioactivity Recovery (% of the initial amount) |
|---|---|---|---|
| | In the Aqueous Phase (10 ml) | In *n*-Decane Extract (1 ml) | |
| **BLANKS** | | | |
| 1 min | 5,800 | 97,600 | 94 |
| 1 hr | 1,600 | 60,500 | 56 |
| 1 day | 400 | 1,400 | 2 |
| 2 days | 300 | 90 | 0.4 |
| 3 days | 500 | 80 | 0.5 |
| **RUNS WITH BIOMASS** | | | |
| 1 min | 8,100 | 99,500 | 102 |
| 1 hr | 34,800 | 2,800 | 34 |
| 1 day | 15,000 | 120 | 14 |
| 2 days | 12,000 | 60 | 11 |
| 3 days | 13,100 | 60 | 12 |

Fig. 4

| Incubation Time, hours | Radioactivity Found (counts/min.) | | | Overall Radioactivity Recovery (% of the initial amount) |
|---|---|---|---|---|
| | In Concrete (2-propanol extracts) | In *n*-Decane Extract | In the Aqueous Phase (including the biomass | |
| **BLANKS** | | | | |
| 6 | 60,300 | 19,600 | 1,900 | 74 |
| 34 | 57,800 | 1,600 | 700 | 55 |
| 96 (4 days) | 53,300 | 700 | 1,200 | 50 |
| **RUNS WITH BIOMASS** | | | | |
| 6 | 68,700 | 200 | 36,600 | 96 |
| 34 | 48,700 | 400 | 33,100 | 75 |
| 96 (4 days) | 51,500 | 400 | 31,800 | 76 |

Fig. 6

| Proportion of Agar in Solid Support | Degradation Efficiency, % |
|---|---|
| 2%, moist | 10-20 |
| 2% | 50-65 |
| 3% | 50-70 |
| 5% | 70-80 |

| Solid Support for Overlay Procedure | Biomass or Blank | Incubation Time, days | | | |
|---|---|---|---|---|---|
| | | 4 | 7 | 11 | 17 |
| 5% Agar | Blank | 76% | 69% | 56% | 55% |
| | Soil Bacteria | 51% | 51% | 40% | 23% |
| | Net Biomass Effect | 25% | 18% | 16% | 32% |
| Filter Paper | Blank | 86% | 84% | 56% | 54% |
| | Soil Bacteria | 58% | 29% | 35% | 22% |
| | Net Biomass Effect | 28% | 55% | 21% | 32% |

Fig. 10

| **Incubation Time, days** | **0** | **7** | **14** | **21** | **28** |
|---|---|---|---|---|---|
| Series 1 | 0% | 15% | 1% | 36% | 4% |
| Series 2 | 0% | 11% | 12% | 2% | 16% |

Fig. 12

REMOVAL OF TOXIC/HAZARDOUS CHEMICALS ABSORBED IN BUILDING MATERIALS

BACKGROUND OF THE INVENTION

Fuel oil spills resulting from storage tank leaks, overfills or catastrophic floods pose a sizable risk to human health. Hydrocarbons get entrapped along with water inside the pore spaces of solids thus forming so called "ganglia." This problem emerged after a catastrophic flood that occurred in Grand Forks, N. Dak. in April 1997. During the flood, a number of fuel oil tanks in residential basements were ruptured, and the spilled hydrocarbons mixed with water and absorbed in concrete walls. Afterward, slow evaporation exposed residents to hydrocarbon vapors for years. Unfortunately, common remediation techniques, such as heating and pump-and-treat technologies, prove to be inefficient. For instance, heating caused pollutants to penetrate deeper within concrete blocks, which merely effected a delay in the release of hydrocarbon vapors into the ambient air. Treating surfaces with soap did not work, because surfactants could not reach the oil trapped in the ganglia.

Most of the research on bioremediation of solids addresses the biodegradation of hydrocarbons in soils. Some research describes the removal of hydrocarbons from other low-porosity solid media, such as sand or metal filings. The feasibility of biotreatment has been postulated for construction debris. Concrete bioremediation has been thoroughly documented only for organochlorine herbicides in stirring reactors suitable only for application on concrete debris. Therefore, there is a need for an efficient method of removing hydrocarbons from the pore spaces of solids.

BRIEF SUMMARY OF THE INVENTION

The present invention is a method of removing pollutants from porous, solid materials. A biomass, which is able to degrade at least one pollutant, is applied on to the porous, solid material. Environmental conditions are sustained until a desired amount of pollutant removal is achieved.

BRIEF DESCRIPTION OF THE DRAWINGS

FIG. 1 is a table summarizing retention of n-hexadecane in concrete samples.

FIG. 2 is a table summarizing the biodegradation potential of n-hexadecane from neat liquid and concrete.

FIG. 3 is a table summarizing partitioning and mass balance of $^{14}$C-labeled carbon originating from n-hexadecane in shaking flasks.

FIG. 4 is a table summarizing $^{14}$C partitioning and mass balance of naphthalene by soil bacteria.

FIG. 6 is a table summarizing $^{14}$C partitioning and mass balance of concrete-absorbed naphthalene in shaking flasks.

FIG. 10 is a table summarizing removal of concrete-absorbed naphthalene using agar plate overlays and filter paper overlays.

FIG. 12 summarizes the results of concrete-absorbed n-hexadecane using filter paper overlays.

DETAILED DESCRIPTION

Figure 5:
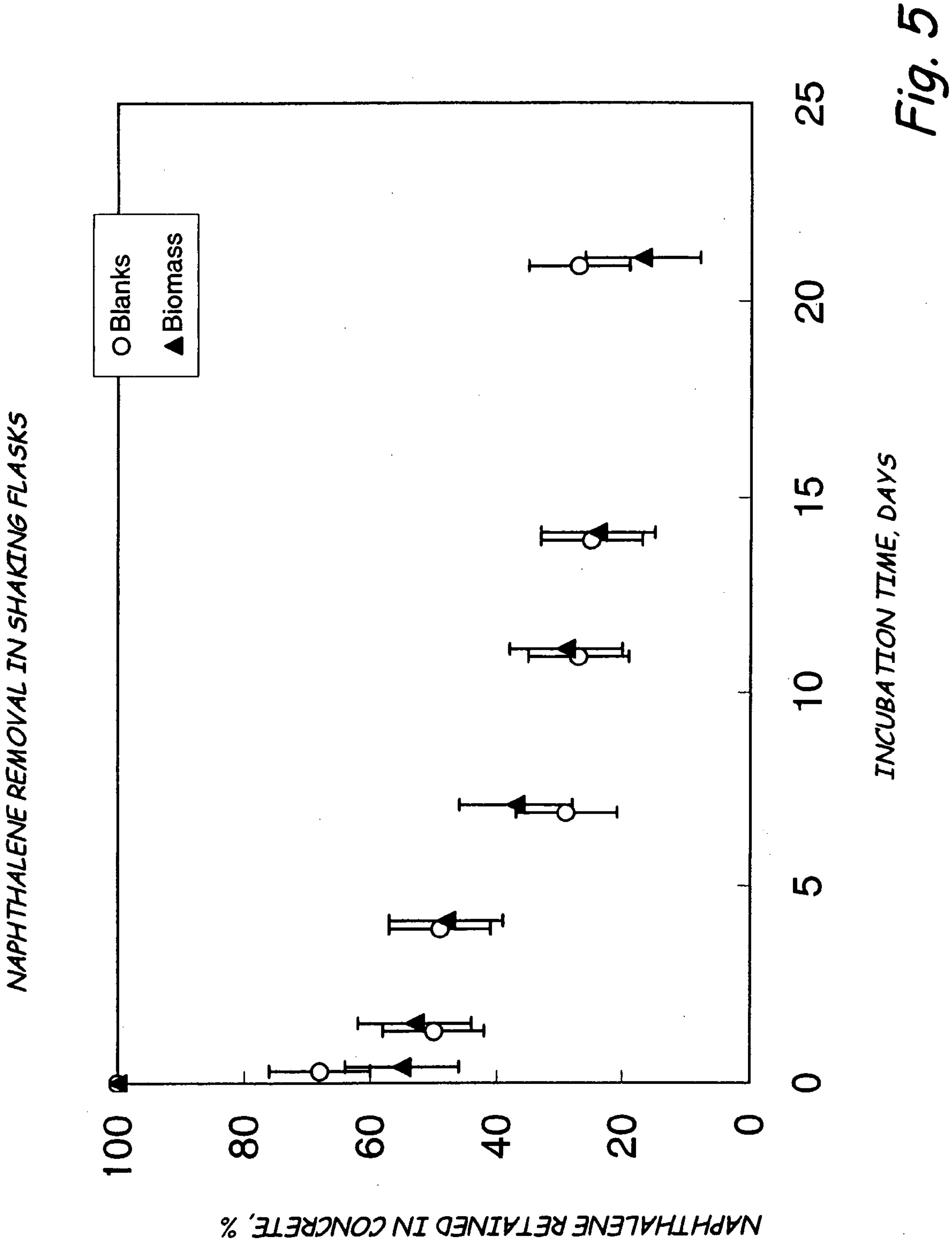
FIG. 5 is a graph illustrating naphthalene retention in concrete.

New evidence suggests that an overlay bioremediation method efficiently removes biodegradable compounds from the pores of solid surfaces. The present invention is designed to take advantage of this finding. Naphthalene removal from concrete and n-hexadecane removal from concrete and wood serve as model systems for studying the findings that are the basis for this invention.

Concrete samples were chipped from a single standard 3000 psi concrete tile manufactured at Concrete, Inc., wood samples were commercial-grade Southern Yellow Pine purchased from Menards (both of Grand Forks, N. Dak., U.S.A.), and reagent grade chemicals were used. $^{14}$C-labeled n-hexadecane and naphthalene were purchased from Sigma and American Radiolabeled Chemicals (St. Louis, Mo.), respectively. Unless stated otherwise, radiolabeled n-hexadecane and naphthalene were used throughout the experiments. All chemicals, solutions, and tools were steam-sterilized by autoclaving for one hour at 2.5 atm.

Scintillation counting was performed on a Beckman 6800 counter in plastic vials using 5 ml of Econo-safe scintillation cocktail (Research Products International, Mount Prospect, Ill., U.S.A.). Biomass concentration was monitored by either optical density or protein assay. Biomass disruption by sodium dodecyl sulfate (SDS) was followed by protein assay using bicinchoninic acid. Cell counts were obtained upon calibration.

The experiments were conducted using *Pseudomonas aeruginosa* PG 201 and two other unidentified strains isolated from oil-contaminated soil that consume naphthalene and n-hexadecane. Expression of hydrocarbon-degrading enzymes by the bacteria may be constitutive or induceable. Biomass was grown in an aqueous mineral medium containing 3.4 g/L $KH_2PO_4$, 4.3 g/L $K_2HPO_4$, 2.0 g/L $(NH_4)_2SO_4$, 0.8 g/L $MgSO_4$, 0.04 g/L $CaCl_2$, 0.03 g/L $FeSO_4$ and 25 ml/L of a trace mineral solution containing 40 mg/L $MnCl_2$, 80 mg/L $Na_2MoO_4$, 6 mg/L $CuSO_4$, 13 mg/L $H_3BO_3$ and 60 mg/L $ZnSO_4$. When growing bacteria for bioremediation experiments, 50–70 ml of mineral medium were inoculated with the desired strain, 0.3 g of a hydrocarbon was added, and the flask was incubated at 30° C. Once growth slowed, the suspension having a cell concentration adjusted to $(4\pm2)\times10^{10}$/ml (the bacterial suspension) was used either in shaking flasks or overlay procedures.

Hydrocarbons present in the liquid phase or adsorbed on flask surfaces were extracted with 1.0 ml of n-decane for 1 min. 10 ml of 2-propanol per a 1.5 g piece of concrete extracted for over 80 hours was used to extract hydrocarbons from concrete. Complete extraction was verified by scintillation counting.

To analyze the mass balance of samples, the biomass was separated by centrifugation at 2,000 rpm for 15 min. 100 µl of 1.0 M ethanolic KOH and 0.9 ml of 2% aqueous SDS solution were added to the pellet and boiled in a water bath for 7 min. to lyse the bacterial cells. The alkali was neutralized with 20 µl of 6.0 M acetic acid, and an aliquot was taken for scintillation counting. The radioactivity of the supernatant was also measured to account for the conversion of the hydrocarbons into water-soluble metabolites. FIG. 1 shows the results of the retention of varied amounts of n-hexadecane by standard size pieces of concrete. The table in FIG. 1 shows data on the leaching of n-hexadecane from concrete by a mineral medium upon a 120 hour incubation.

5, 25, 50 and 100 μl aliquots of neat-form n-hexadecane were applied to 1.2±0.3 g concrete samples. After a 5 minute incubation at room temperature to allow the hydrocarbon to be absorbed into the concrete, the samples were placed in 100 ml flasks containing 10 ml of the sterile mineral medium and shaken on an orbital rotator at 100 rpm at room temperature. After 120 hours, the samples were withdrawn from the mineral medium and extracted with 2-propanol to recover the hydrocarbon retained in the concrete. The contents of the flasks were extracted with 1.0 ml of n-decane to recover the leached, non-retained n-hexadecane. Radioactivity of the extracts was measured to yield the percentage of hydrocarbon retention and mass balance.

As seen in the table of FIG. 1, smaller amounts of n-hexadecane (up to 25 μl per 1.2±0.3 g of concrete) are nearly completely retained by the concrete samples, whereas larger aliquots (over 25 μl) are in part leached out from the concrete sample by the surrounding aqueous solution. Therefore, absorption of up to 25 μl (20 mg) of n-hexadecane per 1 g of concrete is virtually irreversible. This is verified by direct determination of pore volume, which was found to be 104±15 μl per 1 g of concrete. Thus, the relative pore saturation with 25 μl of n-hexadecane, when the n-hexadecane absorption in concrete is irreversible, is approximately 25%.

Subsequent bioremediation experiments use 5 μl aliquots of hydrocarbons since nearly quantitative pollutant absorption is observed even for five times larger amounts. 5 μl aliquots guarantee that all n-hexadecane is retained in the concrete.

FIG. 2 is a table summarizing the biodegradation potential of n-hexadecane from neat liquid and concrete, in the presence and absence of surfactant, by soil bacteria and *Ps. aeruginosa* PG201. 5 μl aliquots of n-hexadecane were incubated for 5–7 days and analyzed as described above. Three surfactants, 0.05% m/v Pluronic F-68, 0.05% m/v Brij-35 and cetyltrimethyl ammonium bromide (CTMA), were added to samples absorbed in concrete for analysis. Both strains nearly quantitatively consumed the neat-form n-hexadecane.

Only moderate removal of concrete-absorbed n-hexadecane was observed after a 7 day incubation. Depending on the strain used, 8%–19% or 10%–17% of n-hexadecane was removed. The addition of surfactants did not increase the efficiency of hydrocarbon degradation. This observation may serve as evidence that substrates must diffuse from the depth of concrete pores. If the hydrocarbons were released from near-surface sites, hydrocarbon diffusion would be facilitated by surfactants resulting in greater removal efficiency. Significant surfactant-induced enhancement of the biodegradation of hydrocarbons absorbed in sand particles was previously demonstrated, and the discrepancy in results should be ascribed to the significant difference in pore volumes and/or structures of the two materials.

Longer incubation times, up to 30 days, were also carried out (data not shown). The values shown in FIG. 2 did not change. Therefore, concrete-absorbed n-hexadecane was consumed with a much lower efficiency compared to neat-form samples.

Biodegradation kinetics were also different for neat-form and concrete-absorbed n-hexadecane. Statistically significant removal of concrete-absorbed n-hexadecane was observed only after 100–120 hours of incubation, whereas the consumption of neat-form n-hexadecane was detected in 48–55 hours. These differences in both the final degradation efficiency and kinetics for neat-form and concrete-absorbed n-hexadecane may be explained by slow substrate diffusion in the pores toward the surface. Therefore, the rate-limiting step appears to switch from biochemical factors in the neat-form n-hexadecane to mass transfer/diffusion factors in the concrete-absorbed samples.

FIG. 3 is a table summarizing partitioning and mass balance of $^{14}C$ originating from n-hexadecane in shaking flasks. Mass balance (radioactivity balance on labeled $^{14}C$-n-hexadecane) was carried out in shaking flask bioremediation experiments. Neat-form or concrete-absorbed n-hexadecane was incubated for 7 days with soil bacteria. Ranges of experimental values for five different biomass samples are provided. The calculated percentages of the concrete-absorbed n-hexadecane are based on the total amount of n-hexadecane removed from the concrete, and since the mass balance on blank concrete samples converged at nearly 100% (FIG. 1), n-hexadecane evaporation was deemed negligible.

The results show that most of the labeled carbon was converted to $CO_2$ rather than accumulating in the biomass, thus indicating that the bacteria removing concrete-absorbed n-hexadecane did not exhibit any significant growth. Since hydrocarbon diffusion in concrete appears to be rate-limiting, this observation may be explained by a slow n-hexadecane release rate from concrete samples. Therefore, bacterial growth is severely limited by the carbon/energy source, such that the bacteria maintain themselves but do not reproduce.

Conversely, for neat-form n-hexadecane, which is more readily accessible to bacteria, substantial biomass growth was observed. These results also show that bacteria remove concrete-absorbed n-hexadecane via biodegradation rather than facilitating desorption—both mechanisms having been observed for bioremediation of solids.

FIG. 4 summarizes the results of neat-form naphthalene partitioning and mass balance of $^{14}C$ by soil bacteria. 110,000 counts/min of $^{14}C$-naphthalene was initially added to shaking flasks either with (Runs with Biomass) or without (Blanks) soil bacteria to compare biodegradation of naphthalene versus naphthalene evaporation. Samples were extracted and analyzed at 1 min., 1 hr., 1 day, 2 days and 3 days. Radioactivity in the n-decane extracts represents non-degraded naphthalene.

Accumulation of radioactivity in the aqueous phase, and its disappearance from the n-decane extract indicated the biotransformation of naphthalene into more polar chemicals. As seen in the table of FIG. 4, biotransformation of neat-form naphthalene commenced within 1 min. and was complete in 1 day.

The dynamics for concrete-absorbed naphthalene differed in that removal of the bulk of the concrete-absorbed naphthalene took days instead of hours. The removal efficiency was also lower compared to the neat-form substrate with 15%–20% of initial naphthalene remaining absorbed in the concrete. This is consistent with a diffusion-controlled process, which was observed for n-hexadecane.

The graph of FIG. 5 illustrates naphthalene retention in concrete either with (Biomass) or without (Blanks) soil bacteria. The percentage of naphthalene retention in concrete versus the incubation time in days is shown. Error bars reflect confidence limits calculated from three parallel runs.

Contrary to n-hexadecane, naphthalene removal was similar either with or without biomass. This suggests that either there was no naphthalene biodegradation, or naphthalene was simply leached from the concrete where the bacteria then degraded some of the naphthalene.

To clarify the issue, $^{14}C$ partitioning and mass balance was carried out for removal of concrete-absorbed naphthalene in shaking flasks. The results both with (Runs with biomass) and without (Blanks) soil bacteria are summarized in FIG. 6. Samples were extracted and analyzed at 6 hrs., 34 hrs. and 96 hrs. (4 days). The results of a single experiment for a 4 day incubation are reported to avoid uncertainty in the mass balance calculations. Radioactivity in the n-decane extracts represents non-degraded naphthalene.

During the first six hours of incubation with biomass, the mass balance was as high as 96% indicating that very little radioactivity was lost due to evaporation. A significant fraction of radioactivity simultaneously accumulated in the aqueous phase implying biotransformation of naphthalene. Nearly one-third (28%–35%) of the initial naphthalene was biotransformed to some water-soluble products in six hours of incubation. This value is similar to the observed naphthalene removal efficiency from concrete shown in FIG. 5. Thus, the removal of naphthalene was due to simple leaching, the biomass merely altering the destination of $^{14}C$ contained in the naphthalene. 35%–50% of the aqueous phase radioactivity accumulated in the biomass with the rest apparently being metabolized into by-products, such as salicylate, which is excreted by naphthalene-grown bacteria. The products of naphthalene biotransformation did not continue to accumlate in the aqueous phase. Apparently, the formation of metabolites of naphthalene and their oxidation to $CO_2$ reached steady state.

By contrast, the distribution of labeled carbon in blanks was different. Most of the naphthalene evaporated from the system with little $^{14}C$ detected in the liquid. For incubations longer than six hours, mass balance converged poorly, presumably due to a partial $^{14}C$ conversion to $CO_2$.

Figure 7:
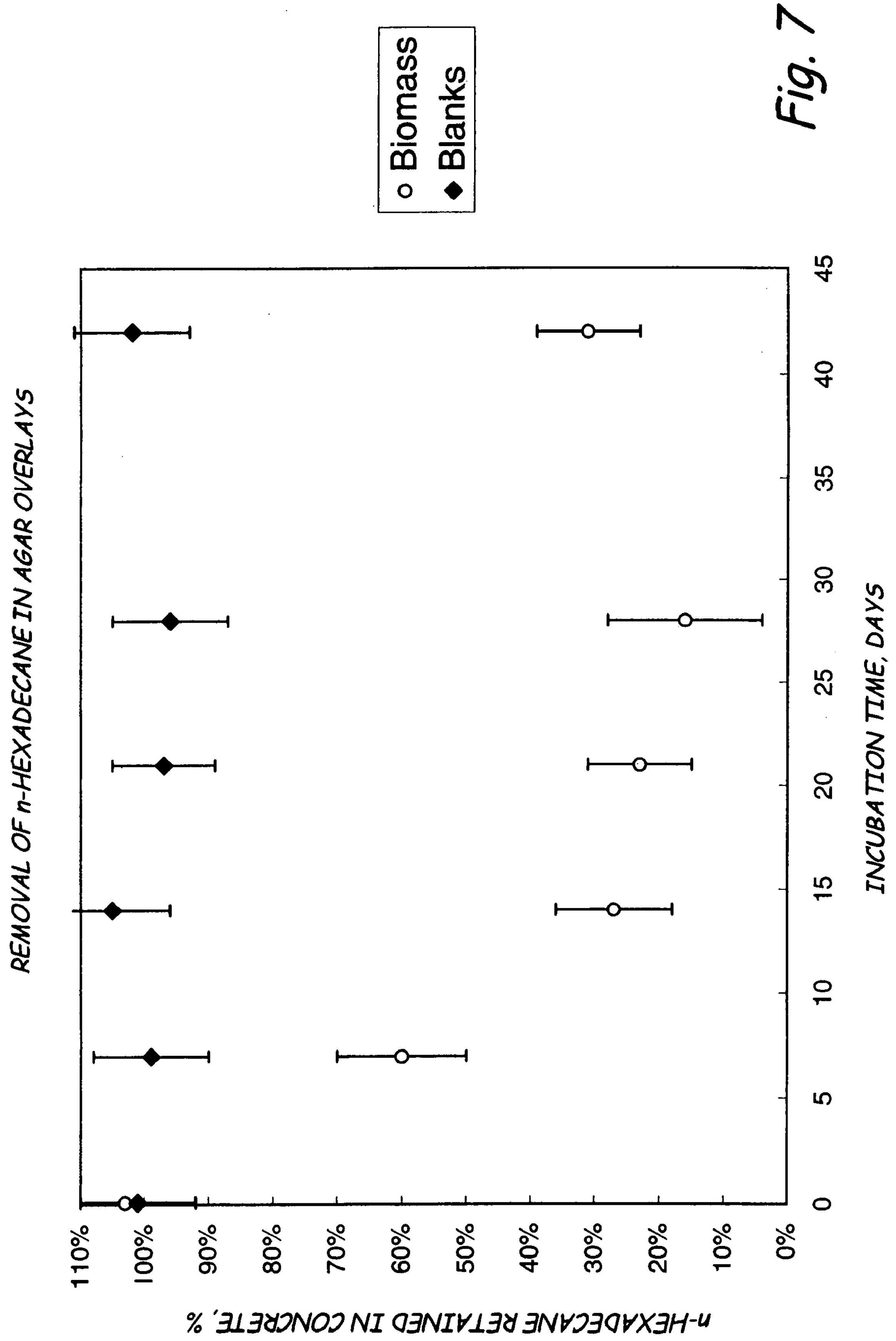
FIG. 7 is a graph illustrating n-hexadecane removal from concrete by agar plate overlays.

Since removal of concrete-absorbed hydrocarbons in shaking flasks is impractical for real world applications, biodegradation of hydrocarbons using overlay techniques was evaluated. The graph of FIG. 7 depicts the results of n-hexadecane removal from concrete by agar plate overlays loaded with *Ps. aeruginosa* PG201. The percentage of n-hexadecane retained in concrete versus incubation time is shown.

To inoculate the agar plates for overlay experiments, 5 μl of the bacterial suspension described previously was spread on the surface of a mineral medium agar plate with an inoculation loop such that two-thirds of the plate surface was covered. The bacteria were then grown at 30° C. for 4 days resulting in cell counts on the plates of about $10^{10}$ cells/cm$^2$.

1.5±0.1 g concrete samples having at least one flat surface were contaminated with a radiolabeled hydrocarbon. The samples were incubated for 5 min. to allow the hydrocarbon to be imbibed by the concrete, and the samples were submerged in 20 ml of sterile mineral medium to create ganglia. The samples were then removed from the liquid and placed flat side down (hydrocarbon having been applied to flat side) on the bacterial biomass adhered to the agar plate. The plates were incubated at room temperature in plastic bags to minimize dessication. Sterile plates with no bacteria were used as blanks. For analysis, the hydrocarbon absorbed in concrete was extracted with 2-propanol and quantified by scintillation counting.

As shown in FIG. 7, as much as 70%–80% of n-hexadecane was removed when contaminated concrete was applied on bacterial biomass adhered to agar plates. This is a much greater efficiency than that observed in the shaking flask experiments (FIG. 2).

Figures 8, 9:
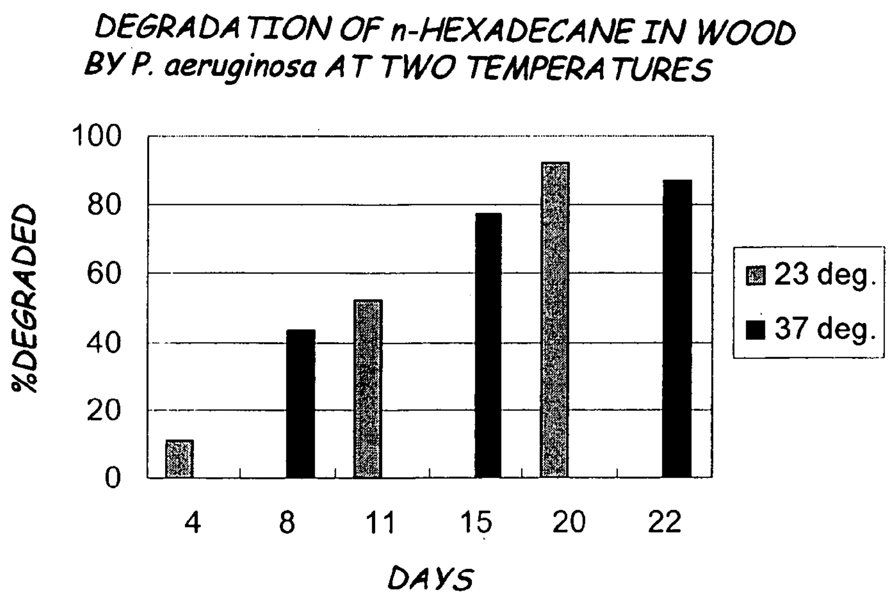
FIG. 8 is a table summarizing removal of n-hexadecane from wood by agar plate overlays containing varying proportions of agar.
FIG. 9 is a graph illustrating removal of n-hexadecane from wood by agar plate overlays at varying temperatures.

FIG. 8 summarizes the results of removal of wood-absorbed n-hexadecane using from 2%–5% agar plate overlays. 5 mm samples of wood were contaminated, decontaminiated with *Ps. aeruginosa*, and analyzed as discussed for concrete samples. The overlay procedures were carried out for three weeks. "2%, moist" means that excess water was added.

The results show that n-hexadecane is efficiently removed from wood using the agar overlay procedure. Notably, as the percentage of agar increased in the overlay, the degradation efficiency also increased.

FIG. 9 graphically illustrates degradation of n-hexadecane from wood at 23° C. and 37° C. The percentage of n-hexadecane degradation versus the incubation time in days is shown. Experiments were carried out as described above using 5% agar plate overlays.

Even at the suboptimal growth conditions of 23° C., the removal of more than 80% of n-hexadecane is achieved in 15–22 days. This is comparable to results at 37° C., which is the optimal growth temperature. These results confirm that the process rate is controlled by diffusion.

FIG. 10 summarizes the results of removal of concrete-absorbed naphthalene using agar plate overlays and filter paper overlays. Naphthalene retention was calculated as the percentage of the initial amount remaining in the concrete. A confidence limit of ±6% of the initial amount of naphthalene is due to the statistical error in hydrocarbon application. The Net Biomass Effect was calculated as the difference between the values for the runs with (Soil Bacteria) and without (Blank) bacteria.

Figure 11:
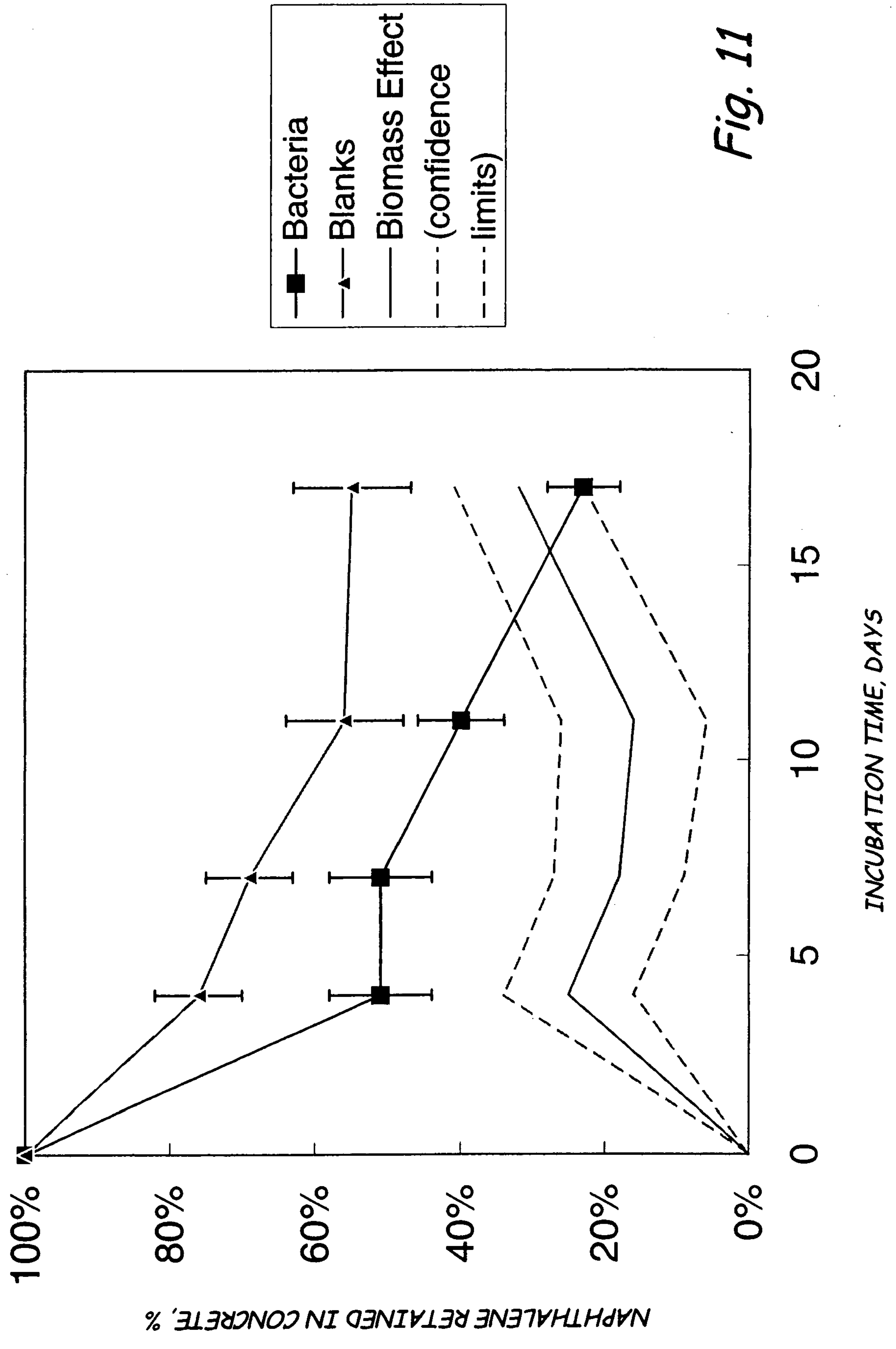
FIG. 11 is a graph illustrating removal of concrete-absorbed naphthalene using agar plate overlays.

FIG. 11 graphically illustrates the data obtained for the agar plate overlay experiments listed in FIG. 10. The error bars reflect the statistical error in naphthalene application. Confidence limits of the Net Biomass Effect were calculated from the combination of errors in Blank and Biomass runs.

As with shaking flasks, experiments with concrete-absorbed naphthalene were complicated by its evaporation. Comparison of the experiments with and without biomass adhered to agar plates showed that, by contrast with shaking flasks, bacterial biomass speeded naphthalene removal from concrete. 16%–32% of naphthalene removal was due to the addition of biomass. It is noteworthy that, as shown in FIG. 11, biodegradation efficiency did not further increase with time. Thus, most of the biotransformation occurred during the first four days of the experiment. The trend of the Blanks suggests that hydrocarbon evaporation leveled off at the same time resulting in lower substrate flux, which was not enough to maintain the induction of biosynthesis of the naphthalene-degrading enzymes.

To gain insight into using this technology for practical applications, filter paper was used as a support for bacteria. Filter paper overlays were prepared by adding 6 ml of the bacterial suspension to a Petri dish containing four layers of filter paper. The filter paper was kept moist throughout the experiment with periodic additions of mineral medium applied with a pipette.

As shown in FIG. 10, filter paper was a suitable option for removing naphthalene. About 40%–80% of naphthalene was removed with the Net Biomass Effect being about 30%. As is similar to agar plate overlays, most of the biodegradation occurred in the beginning of the incubation. After seven days, the absolute biodegradation efficiency leveled off while the relative biomass contribution of naphthalene removal declined. As for agar overlays, this may be poor induction of the synthesis of naphthalene-degrading enzymes upon extended starvation conditions.

Degradation of n-hexadecane was also tested using filter paper overlays. FIG. 12 summarizes the results of removing concrete-absorbed n-hexadecane using *Ps. aeruginosa*

PG201 adhered filter paper overlays. The values given are the percentage of n-hexadecane removal with respect to sterile blanks.

The results of two series of experiments show that n-hexadecane degradation with filter paper overlays was less efficient than for naphthalene. This difference may be explained by a difference in moisture content of the concrete and the relative solubilities of the hydrocarbons.

Water is believed to hinder diffusion of chemicals within porous materials. This trend has been observed for noble gases and volatile organic compounds in concrete and soil and for NaCl in meat. As to volatile chemicals, it is thought that the liquid phase that fills the pores affects the gas phase diffusional resistance. To verify this effect for the present systems, the water content of concrete pieces was measured under conditions characteristic for all three bioremediation protocols.

The water content of concrete samples in shaking flasks after a 24 hr. incubation was 0.104±0.015 g/l g of concrete. For overlays incubated for 7–15 days, the water content was 0.06±0.02 and 0.103±0.012 g/l g concrete for agar plate overlays and filter paper overlays, respectively. The values obtained for both shaking flasks and filter paper overlays were roughly twice that of agar plate overlays. The poor reproducibility of filter paper overlays is likely due to the periodic application of mineral medium making the water content vary between each sample.

The difference in water content of concrete pores may explain the greater removal efficiency of n-hexadecane with agar plate overlays than with filter paper overlays and the greater removal efficiency of naphthalene in shaking flasks. This is consistent with the results of FIG. 8. The increased agar concentrations decreases the moisture content, which led to greater n-hexadecane degradation efficiencies. For a relatively more water-soluble hydrocarbon, like naphthalene, the aqueous layer in the ganglia is not as large an obstacle as it is for n-hexadecane. The aqueous layer provides an alternate, preferred path for naphthalene diffusion toward the surface resulting in greater removal. This dictates the difference in bioremediation strategies for the removal of pollutants of low and relatively high water solubility. For the former, the process should be conducted under controlled moisture conditions; whereas for the latter, excess water is desirable.

The difference in the final biodegradation efficiency in overlay experiments for n-hexadecane and naphthalene may be explained by fast naphthalene evaporation due to its relatively high volatility. Had the 40%–50% of initial naphthalene which had evaporated stayed in the system, it would have been metabolized by bacteria resulting in a removal efficiency similar to n-hexadecane.

The data obtained on naphthalene removal may also be compared with bioremediation of concrete contaminated with herbicides. Removal of herbicides was previously conducted in batch reactors filled with aqueous phase, which in terms of contact and transfer, is comparable to shaking flasks. It was found that herbicides were nearly quantitatively removed from concrete in four weeks. The dynamics of naphthalene removal was similar. This makes sense, because the water solubility of polar herbicides (chlorinated phenols and carboxylic acids) is at least as high as that of naphthalene. However, in contrast to the herbicides, quantitative removal of either naphthalene or n-hexadecane was not observed in our study. At least 15%–20% of either hydrocarbon remained absorbed in concrete, even in long-term experiments, both in shaking flasks and overlays. Perhaps those 15%–20% of hydrocarbons exhibiting very strong absorption in concrete are adsorbed on very hydrophobic surface sites within the pores. A similar observation was made for hydrocarbon absorption in soil.

Preliminary data also indicate that, under conditions similar to removal of hydrocarbons described above, 90% of dinitrotoluene (DNT) is removed by DNT-degrading microorganisms, for example bacteria and fungi, in about 20–40 days from both wood and concrete. Removal efficiencies are similar to those of naphthalene as DNT is even more water-soluble than naphthalene by an order of magnitude.

Hydrocarbons having a molecular formula as high as $C_{20}H_X$, where X varies depending on the level of saturation, have been successfully removed using this technique. Thus, the method of the present invention may be used to remove a variety of pollutants from any porous material—wood and concrete being only two examples.

In practice, there are a number of embodiments by which this method may be performed. The biomass may be sprayed onto the contaminated structure with the support subsequently being applied. The contaminated structure itself may also act as the support for the bacterial biomass. Alternatively, the biomass may be loaded to the support, which is then applied to the contaminated structure. The support may be in the form of a gelatinous material, such as agar; an absorbant paper, such as filter paper; or a liquid having enough viscosity to adhere to the contaminated support.

A gelatinous material is applied by heating the material to a point where it is liquified but will not kill the biomass, pouring the material over the support structure and allowing the material to solidify as it spreads over the structure. Alternatively, a liquid may be used that polymerizes to a gelatinous material.

Wet absorbant paper is hung similar to wall paper. The absorbant paper has an adhesive quality, so that it may stick to the contaminated structure without any other form of adhesive. To insure that the paper remains adhered to the contaminated structure, however, the paper may have areas of adhesive applied so that once wet it loosely sticks to the contaminated structure. Other viscous liquid materials may be sprayed or brushed onto the contaminated structure, similar to applying paint.

The moisture level of the various supports may be maintained by periodic spraying with water or an aqueous mineral medium. Alternatively, a humidifier-type apparatus could be operated that produces a mist. For optimal removal efficiency, the moisture level may be monitored and adjusted to achieve peak pollutant removal consistent with the findings described above.

The nutrients and minerals required for maintenance and/or growth of the biomass will vary depending on the particular biomass used. The biomass may be bacterial or any other type of microorganism. The nutrients and minerals may be added directly to the biomass before its application to the contaminated structure or support. It may also be impregnated within the various supports so that plain water is all that is needed to maintain moisture levels. Alternatively, nutrients and minerals may be added to the water used to maintain moisture levels.

Additionally, ambient temperatures must be within a range that maintains viability of the microorganisms. Generally, the temperature range should be kept between 5° C. and 40° C.

The length of time needed for pollutant removal varies depending on the characteristics of the pollutant, the composition of the contaminated structure, and which embodiment of the present invention is used. Generally, the process will require about one to two months.

Once the desired amount of pollutant is removed from the contaminated structure, the support, if applicable, is removed, and the contaminated structure is cleaned with detergent and water and then with bleach. Most of the microorganisms used for this type of bioremediation are harmless, so a simple clean-up is all that is required.

Although the present invention has been described with reference to preferred embodiments, workers skilled in the art will recognize that changes may be made in form and detail without departing from the spirit and scope of the invention.

The invention of claimed is:

1. A method of removing substantially non-vaporized pollutants from interior pores of a solid material, the method comprising:

loading a biomass able to degrade at least one substantially non-vaporized pollutant to a support; and contacting the biomass loaded onto the support to a surface of the solid material contaminated with the substantially non-vaporized pollutant in the interior of the solid material; and allowing diffusion of the substantially non-vaporized pollutant from the interior of the solid material to the surface to enable degradation by the biomass until an amount of removal of the substantially non-vaporized pollutant is achieved.

2. The method of claim 1 wherein contacting further comprises:

maintaining environmental conditions to sustain pollutant degradation until the amount of degradation of the substantially non-vaporized pollutant is achieved.

3. The method of claim 2 wherein maintaining environmental conditions further comprises:

maintaining ambient temperature between about 5° C. and about 40° C.;

maintaining a moisture level of the biomass sufficient to sustain active degradation of the substantially non-vaporized pollutant by the biomass; and maintaining nutrient levels sufficient to sustain active degradation of the substantially non-vaporized pollutant by the biomass.

4. The method of claim 1 wherein the support is filter paper.

5. The method of claim 1 wherein the support is a gelatinous medium.

6. The method of claim 1 wherein the solid material is concrete.

7. The method of claim 1 wherein the solid material is wood.

8. The method of claim 1 wherein the substantially non-vaporized pollutant is a hydrocarbon.

9. The method of claim 8 wherein the hydrocarbon has a molecular formula of up to about $C_{20}H_X$, wherein X varies depending on a level of saturation of the hydrocarbon.

10. The method of claim 8 wherein the solubility of the hydrocarbon is at least about 1.8 μg/L at room temperature.

11. The method of claim 8 wherein the biomass is comprised of *Pseudomonas aeruginosa.*

12. A method of removing substantially non-vaporized volatile pollutants from interior pores of a solid material, the method comprising:

loading bacterial biomass to a support, the bacterial biomass comprising bacteria able to express enzymes that degrade a substantially non-vaporized volatile pollutant;

contacting the bacterial biomass loaded onto the support to a surface of the solid material contaminated with the substantially non-vaporized volatile pollutant;

allowing diffusion of the substantially non-vaporized volatile pollutant from the interior of the solid material to the surface to enable degradation by the bacterial biomass until an amount of removal of the substantially non-vaporized volatile pollutant is achieved; and maintaining a moisture level of the bacterial biomass such that removal of the substantially non-vaporized volatile pollutant is optimized.

13. The method of claim 12 wherein enzyme expression is constitutive.

14. The method of claim 12 wherein enzyme expression is induced.

15. The method of claim 12 wherein the substantially non-vaporized volatile pollutant is a hydrocarbon.

16. The method of claim 15 wherein the hydrocarbon is fuel oil.

17. The method of claim 12 wherein the support is a gelatinous medium.

18. The method of claim 12 wherein the support is filter paper.

19. The method of claim 12 wherein maintaining a moisture level further comprises:

applying an aqueous solution to the support as a function of a solubility of the substantially non-vaporized volatile pollutant.

20. The method of claim 12 wherein the substantially non-vaporized volatile pollutant has a solubility of at least about 1.8 μg/L at room temperature.

21. The method of claim 15 wherein the hydrocarbon has a molecular formula of up to about $C_{20}H_X$, wherein X varies depending on a level of saturation of the hydrocarbon.

22. A method of removing substantially non-vaporized pollutants from interior pores of a solid material, the method comprising:

applying biomass, able to degrade at least one substantially non-vaporized pollutant, to a surface of the solid material;

allowing diffusion of the substantially non-vaporized pollutant from the interior of the solid material to the surface to enable degradation by the biomass and maintaining environmental conditions to sustain pollutant degradation until an amount of the substantially non-vaporized pollutant degradation is achieved.

23. The method of claim 22 wherein the biomass is combined with a support before being applied to the porous, solid material.

24. The method of claim 22 and further comprising:

applying a support over the biomass.

25. The method of claim 23 wherein the support is from the group consisting of gels, pastes, paper, and aqueous solutions.

26. The method of claim 22 wherein maintaining environmental conditions further comprises:

maintaining ambient temperature between about 5° C. and about 40° C.;

maintaining a moisture level of the biomass sufficient to sustain active degradation of the substantially non-vaporized pollutant by the biomass; and maintaining nutrient levels sufficient to sustain active degradation of the substantially non-vaporized pollutant by the biomass.

27. The method of claim 22 wherein the biomass is maintained on the porous, solid material for about 1 month to about 2 months.

28. The method of claim 22 and further comprising:

removing the biomass from the porous, solid material after the amount of substantially non-vaporized pollutant removal is achieved.

* * * * *

UNITED STATES PATENT AND TRADEMARK OFFICE

CERTIFICATE OF CORRECTION

PATENT NO. : 7,144,725 B2

APPLICATION NO. : 10/378275

DATED : December 5, 2006

INVENTOR(S) : Evguenii I. Kozliak et al.

It is certified that error appears in the above-identified patent and that said Letters Patent is hereby corrected as shown below:

Column 11, Line 5, delete “about 1 month”, insert --about 1 hour--

Signed and Sealed this

Third Day of July, 2007

JON W. DUDAS

*Director of the United States Patent and Trademark Office*

UNITED STATES PATENT AND TRADEMARK OFFICE

CERTIFICATE OF CORRECTION

PATENT NO. : 7,144,725 B2
APPLICATION NO. : 10/378275
DATED : December 5, 2006
INVENTOR(S) : Kozliak et al.

It is certified that error appears in the above-identified patent and that said Letters Patent is hereby corrected as shown below:

In the Specification

Col. 1, Lines 3-5 should read:

STATEMENT OF GOVERNMENT INTEREST
This invention was made with government support under Contract No. 04-JV-11111120-070 awarded by the United States Forest Service. The government has certain rights in the invention.

Signed and Sealed this
Eleventh Day of February, 2014

Michelle K. Lee
*Deputy Director of the United States Patent and Trademark Office*